United States Patent
Kapoor

(10) Patent No.: US 6,396,886 B1
(45) Date of Patent: May 28, 2002

(54) DMT TIME-DOMAIN EQUALIZER ALGORITHM

(75) Inventor: Samir Kapoor, Voorhees, NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/249,530

(22) Filed: Feb. 12, 1999

(51) Int. Cl.[7] .............. H04B 1/10; H03H 7/30; H04K 1/10; H04L 27/28

(52) U.S. Cl. .......... 375/350; 375/232; 375/260

(58) Field of Search ............... 375/229, 230, 375/232, 260, 346, 350; 333/18, 166; 370/203, 204, 210; 708/300, 319, 322, 323

(56) References Cited

U.S. PATENT DOCUMENTS

| | | | |
|---|---|---|---|
| 5,285,474 A | 2/1994 | Chow et al. | 375/231 |
| 5,521,908 A | 5/1996 | Younce et al. | 370/286 |
| 5,870,432 A * | 2/1999 | Kerckhove | 375/232 |
| 6,097,763 A * | 8/2000 | Kjokovic et al. | 375/260 |
| 6,134,265 A * | 10/2000 | Long | 375/350 |

OTHER PUBLICATIONS

IEEE Infocom '98, The Conference on Computer Communications, Tutorial 5 New Access Technologies: XDSL and others, John M. Cioffi, Alan J. Weissberger.

Kapoor et al Copending U.S. Ser. No. 09/252,418, Feb. 18, 1999.

Kapoor et al. Copending U.S. Ser. No. 09/288,478, Apr. 8, 1999.

IEEE Transactions On Communications, vol. 44. No. 12, Dec. 1996, "Impulse Response Shortening for Discrete Multitone Transceivers," Peter J.W. Melsa, Member, IEEE, Richard C. Younce, Member, IEEE, and Charles E. Rohrs, Senior Member, IEEE, pp. 1162–1672.

M. Nafie and A. Gatherer, "Time–Domain Equalizer Training for ADSL," Proc. ICC '97, pp. 1085–1089, 1997.

* cited by examiner

Primary Examiner—Betsy L. Deppe
(74) Attorney, Agent, or Firm—Ostrolenk, Faber, Gerb & Soffen, LLP

(57) ABSTRACT

An apparatus for receiving a discrete multi-tone signal over a communications channel having an impulse response h(n), energy of the impulse response being substantially concentrated in a first band of samples, the apparatus including: a receiver for receiving the discrete multi-tone signal; and a T coefficient finite impulse response time-domain equalizer included in the receiver, the time-domain equalizer having an output additive noise signal, the T coefficients of the time-domain equalizer being provided such that: (a) energy of an effective impulse response $h_{eff}(n)$ of at least the communications channel combined with the time-domain equalizer is substantially concentrated in a second band of V+1 samples, whereby the second band of samples is shorter than the first band of samples; and (b) a variance in a frequency spectrum of the output additive noise signal of the time-domain equalizer is controlled.

13 Claims, 4 Drawing Sheets

DMT TIME-DOMAIN EQUALIZER ALGORITHM

BACKGROUND OF THE INVENTION

1. Field of the Invention

The present invention relates to the use of a time-domain equalizer (TEQ) algorithm in a discrete multi-tone transceiver (DMT) and, more particularly, to a time-domain equalizer algorithm which operates as both a channel shortening filter and a noise whitening filter.

2. Related Art

The fast, efficient and error-free transmission of digital information from one point to another has become increasingly important. Many communications systems exist which permit digital information to be transmitted over various types of communication channels, such as wireless channels, fiber-optic channels, and wire line channels.

The present invention will be described in the context of a wire line communications channel, such as a telephone line which utilizes a twisted pair of copper wires. It is noted that the use of the present invention is not limited to wire line systems as those skilled in the art will appreciate from the discussion hereinbelow.

A modem is typically used to transmit and receive digital data over a telephone line. Modems employ a modulator to transmit the digital data over the telephone line and a demodulator to receive digital data from the telephone line. One common modulation technique is known as digital multi-tone modulation which requires a discrete multi-tone transmitter and a discrete multi-tone receiver at each modem in a communication system. Often, those skilled in the art refer to such modems as employing a DMT physical layer modulation technique.

Reference is now made to FIG. 1 which is a block diagram of a conventional DMT communications system 1. The system 1 includes a DMT transmitter 10, a transmission channel 20, and a DMT receiver 30. The DMT transmitter 10 includes a symbol generator 12, an inverse fast fourier transform (IFFT) modulator 14, and a cyclic prefix generator 16. The DMT transmitter 10 receives an input bit stream b(n) which is fed into the symbol generator 12. The symbol generator 12 produces a signal X(k) which is fed into the IFFT modulator 14. X(k) is a complex signal (i.e., a signal understood by those skilled in the art to comprise both a real and an imaginary component) formed by mapping pairs of bits of the input bit stream b(n) into a complex data space such that the complex signal X(k) has a length of N/2 samples. Symbol generator 12 also augments the signal X(k) with a complex conjugate to obtain a conjugate symmetric signal of N samples.

The IFFT modulator 14 performs an N-point inverse fast fourier transform on the conjugate complex signal X(k) to obtain the sampled real signal x(n). Since X(k) is a symmetric signal, the output of the IFFT modulator 16 is a real signal x(n). The real signal x(n) may be thought of as the summation of a plurality of cosine functions each having a finite length and a different frequency, phase, and amplitude, where these frequencies are multiples of a fundamental frequency. Since each of the cosine functions has a finite duration, x(n) is a varying amplitude discrete signal having a finite duration spanning N samples.

For the purpose of simplifying equations which will be discussed below, the transmission channel 20 is modeled as including a D/A converter 22, transmit filter (not shown), a receive filter (not shown), and an A/D converter 26 on either end of a wire loop 24. Those skilled in the art will appreciate that a practical system will employ the D/A converter 22 (and the transmit filter) in the DMT transmitter 10 and will employ the A/D converter 26 (and the receive filter) in the DMT receiver 30.

Those skilled in the art will appreciate that the frequency spectrum of x(n) may be thought of as a plurality of orthogonal (SIN X)/(X) functions, each centered at a respective one of the frequencies of the cosine functions of x(n).

x(n) is transmitted over the channel 20 to the DMT receiver 30. Since the transmission channel 20 has a non-ideal impulse response h(n), the received signal y(n) will not exactly match x(n). Instead, y(n) will be a function of the convolution of x(n) and h(n). Typically, h(n) will look substantially like the curve shown in FIG. 2. The non-ideal characteristic of h(n) introduces an amount of interference (specifically intersymbol and interchannel interference) which should be compensated for in both the DMT transmitter 10 and the DMT receiver 30.

A common technique in compensating for the non-ideal impulse response of the transmission channel 20 is to introduce a so-called guard band at the beginning of each finite duration signal x(n) to produce x'(n). The cyclic prefix generator 16 performs this function. The guard band is typically formed of the last V samples of x(n) for each DMT symbol. If the length of the impulse response h(n) of the transmission channel 20 is less than or equal to V+1, then the guard band of length V will be sufficient to eliminate the interference cause by the impulse response h(n). The guard band is commonly referred to in the art as a "cyclic prefix" (CP).

Unfortunately, the impulse response h(n) of a typical transmission channel 20 may be excessively long, requiring cyclic prefix lengths which substantially reduce the rate at which digital bits are transmitted across the transmission channel 20. The DMT receiver 30, therefore, employs signal processing techniques which effectively shorten the impulse response h(n) of the transmission channel 20, thereby permitting a corresponding reduction in the length of the cyclic prefix required at the DMT transmitter 10.

The DMT receiver 30 includes a time-domain equalizer (TEQ) 32, a window circuit 34, a fast fourier transform (FFT) demodulator 36, and a bit generator 38. The time-domain equalizer 32 is a finite impulse response (FIR) filter designed to compensate for the non-ideal impulse response h(n) of the transmission channel 20. In particular, the time-domain equalizer 32 employs a finite number of coefficients (T) which are calculated to compensate for the non-ideal impulse response of the transmission channel 20. As will be discussed in more detail below, the time domain equalizer 32 operates on the impulse response h(n) of the channel 20 such that the combined impulse response $h_{eff}(n)$ of the channel 20 and the time domain equalizer 32 has maximum energy within a limited band of samples. This may be thought of as "shortening" the effective impulse response of the channel 20. The output of the time domain equalizer is z'(n).

A window circuit 34 is employed to remove the cyclic prefix from z'(n) to obtain z(n). The signal z(n) is input into the FFT demodulator 36 (which is understood to include a frequency domain equalizer function) to produce the complex symmetric signal X(k). After the complex conjugate portion of the signal X(k) is removed, the bit generator 38 maps the complex signal X(k) into an output bit stream b(n), which theoretically matches the input bit stream b(n).

Several algorithms exist for calculating the T coefficients of the time-domain equalizer 32. One such algorithm is referred to as the least squares based pole zero cancellation algorithm (hereinafter "PROCESS #1"), which is discussed in detail in P. J. Melsa, R. Y. Younce and C. E. Rohrs, "Impulse Response Shortening for Discrete Multitone Transceivers," *IEEE Trans. On Comm.* Vol. 44, No. 12, pp. 1662–71, December 1996, the entire disclosure of which is hereby incorporated by reference. Another such algorithm is referred to as the optimal shortening algorithm (hereinafter "PROCESS #2"), which is also discussed in detail in the above referenced IEEE publication. Still another algorithm is referred to as the eigenvector approach using the power method (hereinafter "PROCESS #3"), which is discussed in detail in M. Nafie and A. Gatherer, "Time-Domain Equalizer Training for ADSL," *Proc. ICC*, pp. 1085–1089 (1997), the entire disclosure of which is hereby incorporated by reference.

Although the above techniques for calculating the coefficients of the time-domain equalizer 32 address the issue of "shortening" the effective impulse response of the transmission channel 20, they do not adequately address the problem of interference caused by noise. The system 1 is susceptible to injected white noise and colored noise. Colored noise exhibits concentrated spectral energy at some frequencies and relatively little spectral energy at other frequencies. White noise exhibits a substantially constant amount of spectral energy at all frequencies.

While the conventional DMT receiver 30 of FIG. 1 operates optimally when white noise is present at the output of the time domain equalizer 32, it is susceptible to inter-channel interference when colored noise is present. This is a particularly difficult problem when the colored noise exhibits spectral nulls.

Colored noise may be present at the output of the time domain equalizer 32 because (i) additive colored noise was injected into the signal x'(n) as it was transmitted over the transmission channel 20; and/or (ii) the time domain equalizer 32 itself introduces spectral shaping (especially spectral nulls) into the signal z'(n). Thus, even if the transmission channel 20 does not introduce additive colored noise into the received signal y(n), the time domain equalizer 32 may itself introduce spectral coloration into the additive noise of signal z'(n). Consequently, although the time domain equalizer 32 may produce a "shorter" effective impulse response $h_{eff}(n)$, it may degrade system performance by introducing colored noise (especially spectral nulls) into z'(n). In particular, the rate at which data bits b(n) are transmitted over the transmission channel 20 and the error rate of such transmission may be adversely affected by colored noise at the output of the time domain equalizer 32.

Accordingly, there is a need in the art for an improved DMT communication system which is capable of (i) compensating for the non-ideal impulse response of a transmission channel; (ii) compensating for additive colored noise introduced by the transmission channel; and/or (iii) mitigating against the spectral coloration of additive noise by the time domain equalizer.

SUMMARY OF THE INVENTION

In order to overcome the disadvantages of the prior art, an apparatus for receiving a discrete multi-tone signal over a communications channel having an impulse response h(n), energy of the impulse response being substantially concentrated in a first band of samples, the apparatus comprising:
a receiver for receiving the discrete multi-tone signal; and
a T coefficient finite impulse response time-domain equalizer included in the receiver, the time-domain equalizer having an output additive noise signal, the T coefficients of the time-domain equalizer being provided such that:
(a) energy of an effective impulse response $h_{eff}(n)$ of at least the communications channel combined with the time-domain equalizer is substantially concentrated in a second band of V+1 samples, whereby the second band of samples is shorter than the first band of samples; and
(b) a variance in a frequency spectrum of the output additive noise signal of the time-domain equalizer is controlled.

The time-domain equalizer of the present invention preferably has an input additive noise signal, the T coefficients of the time-domain equalizer being provided as a function of both the input additive noise signal and an estimate of the impulse response h(n).

The receiver is preferably operable to compute the T coefficients of the time-domain equalizer as a function of balancing (i) a degree to which the energy of the effective impulse response $h_{eff}(n)$ is concentrated: in the second band of V+1 samples; and (ii) a degree to which the variance in the frequency spectrum of the output additive noise of the time-domain equalizer is reduced.

The receiver is preferably operable to vary the degree to which the energy of the effective impulse response $h_{eff}(n)$ is concentrated in the second band of V+1 samples; and the degree to which the variance in the frequency spectrum of the output additive noise of the time-domain equalizer is reduced.

The receiver is preferably operable to compute the T coefficients of the time-domain equalizer by evaluating the following system of equations:

$$\min|_w w^T(H_{out}^T H_{out} + \beta_{out} R)w, \text{ subject to } w^T(H_{in}^T H_{in} + \beta_{in} R)w = 1,$$
where w is a T×1 matrix representing the T coefficients of the time-domain equalizer, $H_{out}$ is an (M+T−V−2)×T matrix representing samples of the estimated impulse response h(n) of the communications channel which produce M+T−V−2 samples of the effective impulse response $h_{eff}(n)$ not containing concentrated energy when matrix w is multiplied by $H_{out}$, $H_{in}$ is a (V+1)×T matrix representing samples of the estimated impulse response h(n) of the communications channel which produce the V+1 samples of the effective impulse response $h_{eff}(n)$ having concentrated energy when matrix w is multiplied by $H_{in}$, R is a T×T additive noise correlation matrix constructed from the input additive noise signal, and $\beta_{out}$ and $\beta_{in}$ are scalars which vary the degree to which the energy of the effective impulse response $h_{eff}(n)$ is concentrated in the second band of V+1 samples; and the degree to which the variance in the frequency spectrum of the output additive noise of the time-domain equalizer is reduced.

The receiver is preferably operable to obtain w by solving $w=(\sqrt{G^T})^{-1}e_{min}$, where $G=H_{in}^T H_{in}+\beta_{in} R$, and $e_{min}$ is an eigenvector corresponding to the smallest eigenvalue of $(\sqrt{G})^{-1}(H_{out}^T H_{out}+\beta_{out} R)(\sqrt{G^T})^{-1}$.

The present invention also provides a method of determining T coefficients of a finite impulse response time-domain equalizer having input and output additive noise signals, the time-domain equalizer being employed in a receiver for receiving a discrete multi-tone signal over a communications channel having an impulse response h(n), energy of the impulse response being substantially concentrated in a first band of samples, the method comprising the step of:

computing the T coefficients of the time-domain equalizer such that:

(a) energy of an effective impulse response $h_{eff}(n)$ of at least the communications channel combined with the time-domain equalizer is substantially concentrated in a second band of V+1 samples, whereby the second band of samples is shorter than the first band of samples; and (b) a variance in a frequency spectrum of the output additive noise signal of the time-domain equalizer is controlled.

The method of the present invention also preferably comprises the step of balancing (i) a degree to which the energy of the effective impulse response $h_{eff}(n)$ is concentrated in the second band of V+1 samples; and (ii) a degree to which the variance in the frequency spectrum of the output additive noise of the time-domain equalizer is reduced.

The method of the present invention also preferably comprises the step of varying the degree to which the energy of the effective impulse response $h_{eff}(n)$ is concentrated in the second band of V+1 samples; and the degree to which the variance in the frequency spectrum of the output additive noise of the time-domain equalizer is reduced.

It is preferred that the method of the present invention also include the steps of:

estimating the impulse response h(n) of the communication channel;

estimating the input additive noise signal to the time-domain equalizer;

providing a T×1 matrix w representing the T coefficients of the time-domain equalizer;

providing a (V+1)×T matrix $H_{in}$ representing samples of the estimated impulse response h(n) of the communications channel which produce the V+1 samples of the effective impulse response $h_{eff}(n)$ having concentrated energy when matrix w is multiplied by $H_{in}$; and providing an (M+T−V−2)×T matrix $H_{out}$ representing samples of the estimated impulse response h(n) of the communications channel which produce M+T−V−2 samples of the effective impulse response $h_{eff}(n)$ not containing concentrated energy when matrix w is multiplied by $H_{out}$.

It is also preferred that the method of the present invention include the steps of:

providing a T×T additive noise correlation matrix R from the input additive noise signal, and determining scalars $\beta_{out}$ and $\beta_{in}$ which control a degree to which the energy of the effective impulse response $h_{eff}(n)$ is concentrated in the second band of V+1 samples; and a degree to which the variance in the frequency spectrum of the output additive noise of the time-domain equalizer is reduced It is also preferred that the step of computing the T coefficients of the time-domain equalizer is obtained by solving the following system of equations:

$$\min|_w w^T(H_{out}^T H_{out}+\beta_{out}R)w, \text{ subject to } w^T(H_{in}^T H_{in}+\beta_{in}R)w=1.$$

In the method of the present invention, it is also preferred that w is obtained by solving $w=(\sqrt{G^T})^{-1}e_{min}$, where $G=H_{in}^T H_{in}+\beta_{in}R$ and $e_{min}$ is an eigenvector corresponding to the smallest eigenvalue of: $(\sqrt{G})^{-1}(H_{out}^T H_{out}+\beta_{out}R)(\sqrt{G^T})^{-1}$.

Other features and advantages of the present invention will become apparent from the following description of the invention which refers to the accompanying drawing.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF THE PREFERRED EMBODIMENT OF THE INVENTION

Figure 3:
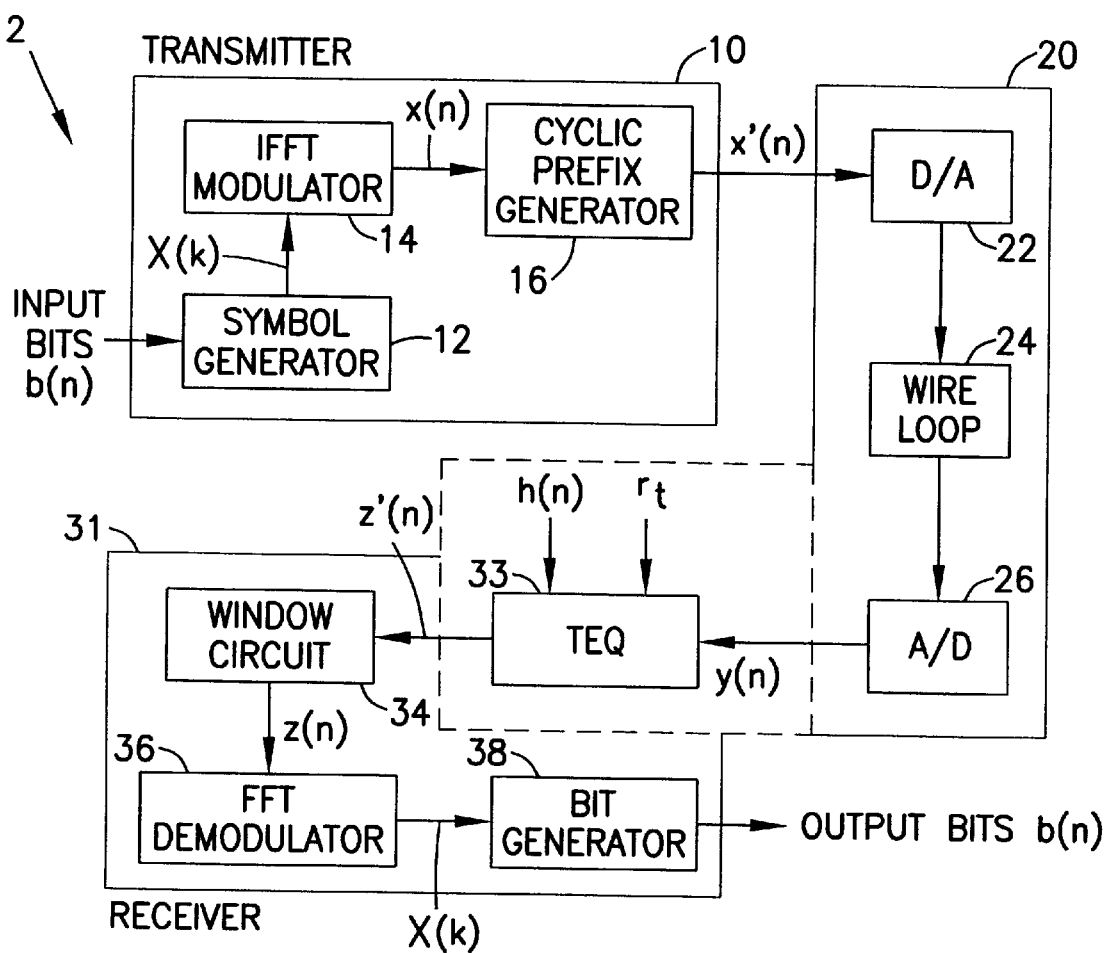
FIG. 3 is a block diagram of a discrete multi-tone communications system according to the present invention.

Referring now to the drawing wherein like reference numerals indicate like elements, there is shown in FIG. 3 a block diagram of a discrete multi-tone communications system 2 in accordance with the present invention. As is the case in the discrete multi-tone communications system 1 shown in FIG. 1, the discrete multi-tone communications system 2 of the present invention includes a transmitter 10 for producing a discrete multi-tone signal x'(n) to be transmitted over a transmission channel 20.

Figure 1:
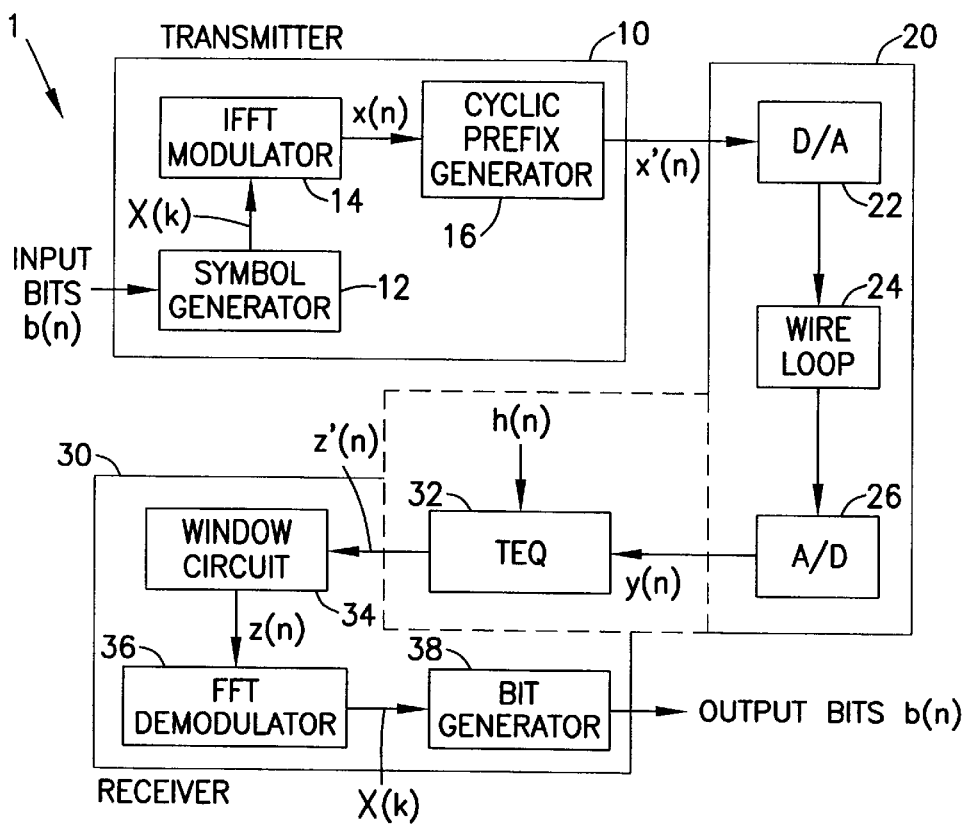
FIG. 1 is a block diagram of a discrete multi-tone communications system according to the prior art.

The discrete multi-tone communications system 2 of the present invention also includes a receiver 31 comprising a window circuit 34, an FFT demodulator 36, and a bit generator 38 which are substantially similar to those numbered elements in FIG. 1. Unlike the receiver 30 of FIG. 1, the receiver 31 of FIG. 3 includes a time-domain equalizer 33 which is capable of (i) compensating for the non-ideal impulse response of a transmission channel; (ii) compensating for additive colored noise introduced by the transmission channel; and/or (iii) preventing the introduction of noise coloration by the time domain equalizer.

As discussed above, a time-domain equalizer may be implemented using a finite impulse response filter having T coefficients. The present invention is directed to determining these T coefficients such that an effective impulse response $h_{eff}(n)$ of, for example, the transmission channel 20 coupled with the time-domain equalizer 33 has maximum energy concentrated at a particular band of samples (having a first length) while the impulse response h(n) of the transmission channel 20 alone has maximum energy concentrated at another band of samples (having a second length), where the first length is shorter than the second length. The present invention is also directed to determining these T coefficients such that a noise profile at the output of the time-domain equalizer 33 exhibits a substantially flat frequency spectrum as compared to the frequency spectrum of an additive noise profile produced by a conventional time domain equalizer.

In calculating the T coefficients of the time-domain equalizer 33, the discrete multi-tone receiver 31 of the present invention solves a cost function which results in concentrating the energy of the effective impulse response in a relatively narrow band of samples while also ensuring that the additive noise profile at the output of the time domain equalizer 33 has a minimized variation (i.e., the additive noise profile is whitened). The cost function may be expressed by the following system of equations:

$$\min|_w w^T(H_{out}^T H_{out} + \beta_{out} R)w, \text{ subject to } w^T(H_{in}^T H_{in} + \beta_{in} R)w = 1$$
where w is a T×1 matrix representing the T coefficients of the time-domain equalizer, $H_{out}$ is an (M+T−V−2)×T matrix representing samples of the estimated impulse response h(n) of the communications channel which produce M+T−V−2 samples of the effective impulse response $h_{eff}(n)$ not containing concentrated energy when matrix w is multiplied by $H_{out}$, $H_{in}$ is a (V+1)×T matrix representing samples of the estimated impulse response h(n) of the communications channel which produce the V+1 samples of the effective impulse response $h_{eff}(n)$ having concentrated energy when matrix w is multiplied by $H_{in}$, R is a T×T additive noise correlation matrix constructed from the input additive noise signal, and $\beta_{out}$ and $\beta_{in}$ are scalars which vary the degree to which the energy of the effective impulse response $h_{eff}(n)$ is concentrated in the second band of V+1 samples; and the degree to which the variance in the frequency spectrum of the output additive noise of the time-domain equalizer is reduced.

Figure 4A:
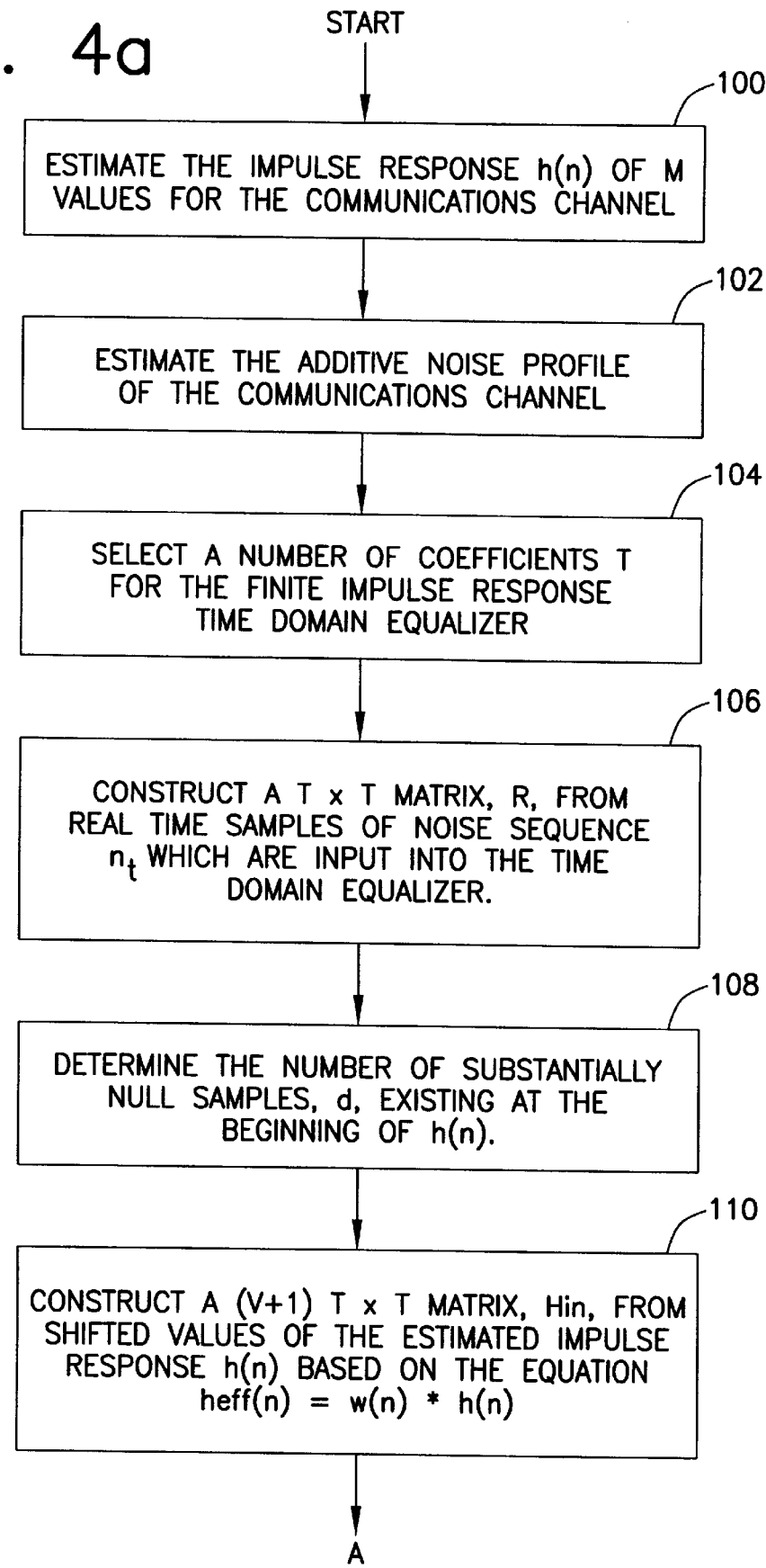
FIGS. 4a and 4b are flow charts illustrating the functions performed by the discrete multi-tone communications system of FIG. 3.
Figure 4B:
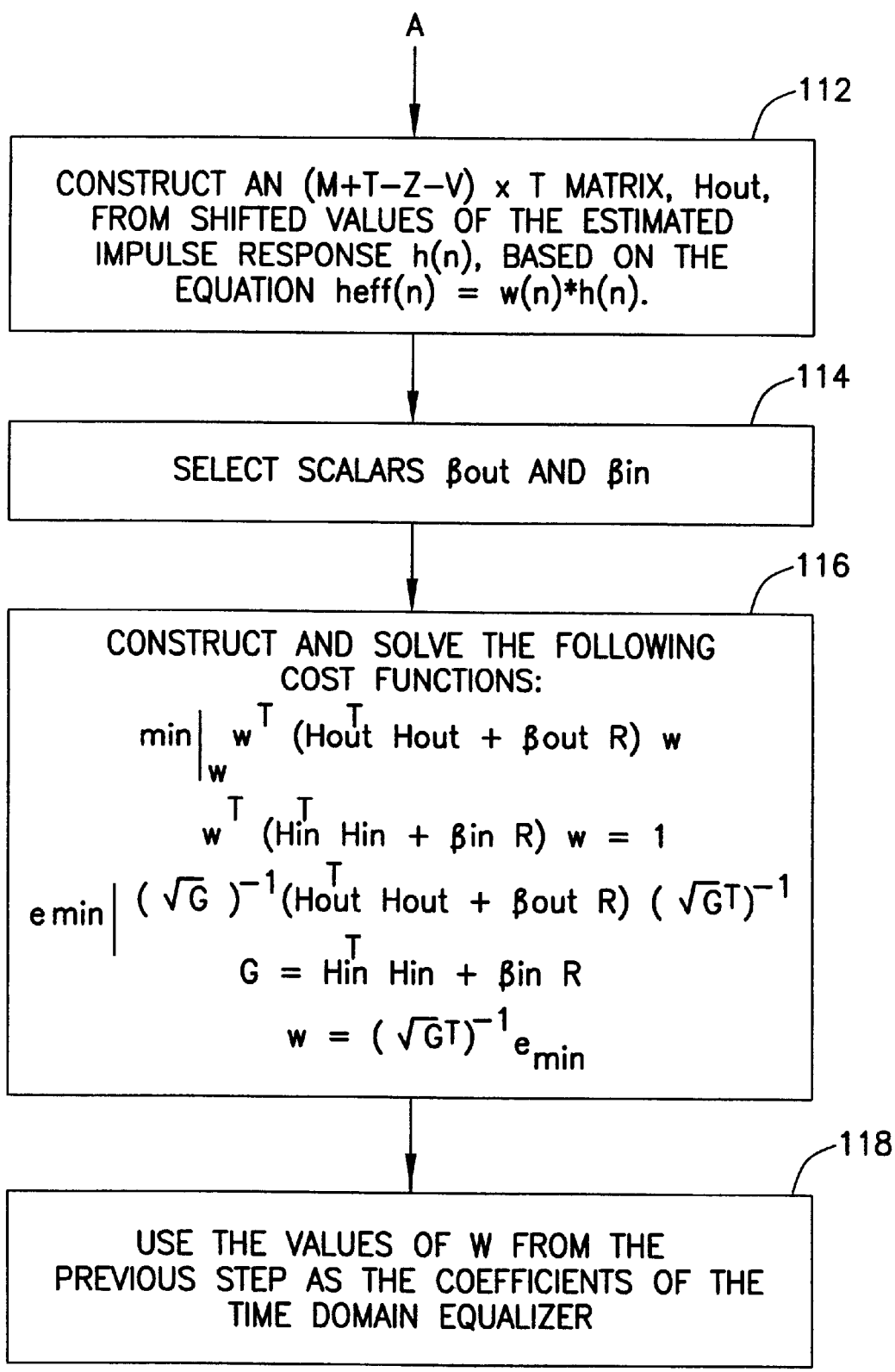

Referring to FIGS. 4a and 4b, the solution to the above cost function may be obtained by carrying out the following steps. Assuming that the transmission channel 20 consists of D/A converter 22, transmit filter (not shown), wire loop 24, receive filter (not shown), and A/D converter 26, the impulse response h(n) having M values (or samples) of the transmission channel 20 is estimated at step 100.

Those skilled in the art will understand that an estimate of the impulse response h(n) of the transmission channel 20 may be obtained using any of the known methods, such as the frequency-domain method or the time-domain method. In the frequency-domain method, a periodic pseudo-random training sequence is transmitted over the transmission channel 20 for a predetermined number (P) of discrete multi-tone signals x(n). Letting $X_i$ denote the i-th sequence sample, a vector $Y_{i,p}$ at the output of the FFT demodulator 36 is given by:

$$Y_{i,p} \approx H_i X_i + N_{i,p}, i=1, \ldots, M; p=1, \ldots, P$$

In the above equation, $H_i$ is the i-th frequency-domain impulse response value (assuming at time invariant system) and $N_{i,p}$ denotes the samples of the additive noise profile of the transmission channel 20. When the vector $Y_{i,p}$ is averaged over all of the symbols and divided by $X_i$, an estimate of the transfer function of the transmission channel 20 is obtained as:

$$H_i = \frac{(1/P)\sum_{p=1}^{P} Y_{i,p}}{X_i}$$

When the inverse fourier transform of the estimate of the transfer function of the transmission channel 20 $H_i$ is taken, an estimate of the impulse response h(n) having M values is obtained.

When the time-domain method is used to obtain an estimate of the impulse response h(n) of the transmission channel 20, an impulse train is transmitted at the rate of one impulse per discrete multi-tone signal period for a predetermined number of discrete multi-tone signals. An estimate of the impulse response of the transmission channel 20 may be obtained by averaging the received signal at the output of the time-domain equalizer 33.

It has been found that, in certain circumstances, the time-domain method is preferred over the frequency-domain method for obtaining an estimate of the impulse response h(n) of the transmission channel 20. Those skilled in the art, however, will understand that other methods may be used without departing from the scope of the invention.

Referring again to FIG. 4a, an estimate of the additive noise profile of the transmission channel 20 is obtained at step 102. Those skilled in the art will appreciate that any of the known methods for estimating the additive noise profile may be utilized. For example, when the frequency-domain method is utilized to obtain an estimate of the impulse response h(n) of the transmission channel 20, the training sequence may be repeated again after the impulse response h(n) has been estimated and the additive noise profile $N_{i,q}$ may be obtained in the frequency domain using the following equation:

$$N_{i,q} \approx Y_{i,q} - H_i X_i, i=1, \ldots, M$$

where Q is the number of symbols x(n) used to estimate the noise profile.

The time domain noise profile $n_{i,q}$ may be obtained by performing an IFFT on $N_{i,q}$ (for each symbol time, q) and retaining only the real part of the complex result.

Next, the number of coefficients T of the time-domain equalizer 33 are selected (step 104).

At step 106, a T×T additive noise correlation matrix R is constructed from the values of $n_{i,q}$ using known recursive techniques. For example, the t-th additive noise correlation value (or coefficient) may be expressed as:

$$r_t = \frac{1}{MQ} \sum_i \sum_q n_{i,q} n_{i+t,q} \quad \text{where } t = 0, \ldots, (T-1)$$

Thus, $r_t$ may be recursively updated each symbol time a new vector $n_q$ becomes available. Since M is typically much larger than T, good estimates of $r_t$ may be obtained using small numbers Q of multi-tone signals x(n) during the training sequence. The additive noise correlation matrix R is thus given by:

$$R = \begin{bmatrix} r_0 & r_1 & \cdots & r_{T-1} \\ r_1 & r_0 & \cdots & r_{T-2} \\ \vdots & \vdots & \ddots & \vdots \\ r_{T-1} & r_{T-2} & \cdots & r_0 \end{bmatrix}$$

It is noted that when it is known that the noise input to the time-domain equalizer 33 is white, only $r_0$ need be calculated. R would thus be a T×T diagonal matrix of $r_0$, where $r_0$ represents the variance of the white noise.

Figure 2:
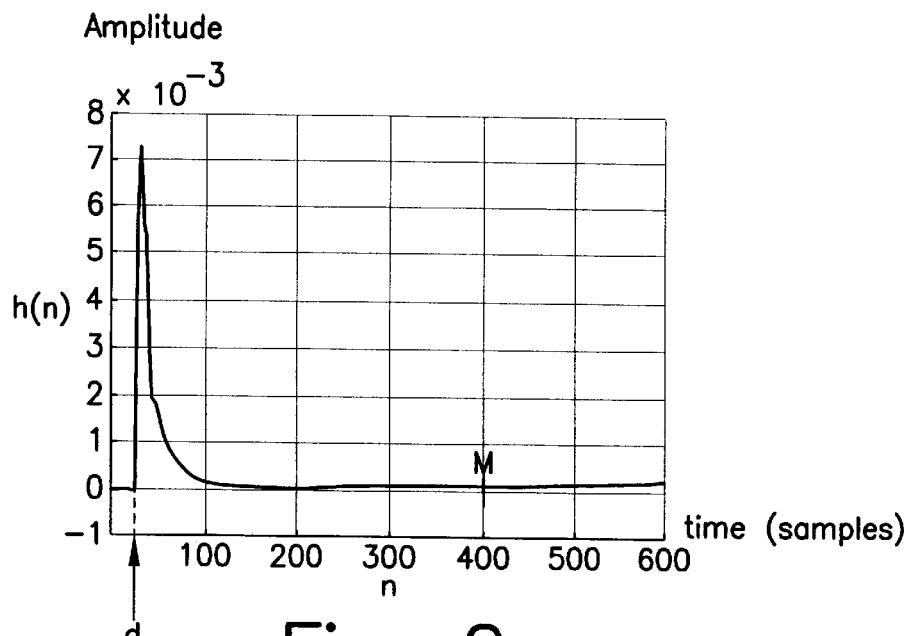
FIG. 2 is a graph showing the impulse response of a typical communications channel.

Reference is now made to FIG. 4a and FIG. 2. The impulse response h(n) is substantially null until time d and, therefore, d is estimated at step 108 and used to compute matrices $H_{in}$ (step 110) and $H_{out}$ (step 112).

At step 110, a (V+1)×T matrix $H_{in}$ is determined as a function of the values of h(n). In particular, $H_{in}$ is determined by expanding the following equation:

$$h_{eff}(n)=h(n)*w(n),$$

where w(n) is a sequence representing the T coefficients of the time domain equalizer 33.

The convolution operation (*) is well known and yields:

$$h_{eff}(n) = \sum_{k=0}^{T-1} w(k) \cdot h(n-k)$$

When n=d, the above equation expands into a matrix product as follows:

$$h_{eff}(d)=[h(d)h(d-1) \ldots h(d-T+1)] \begin{bmatrix} w(0) \\ w(1) \\ \vdots \\ w(T-1) \end{bmatrix}$$

Thus, the effective impulse response $h_{eff}(n)$, where n is from d to d+V, may be expressed as a matrix as follows:

$$\begin{bmatrix} h_{eff}(d) \\ h_{eff}(d+1) \\ \vdots \\ h_{eff}(d+V) \end{bmatrix} = \begin{bmatrix} h(d) & h(d-1) & \cdots & h(d-T+1) \\ h(d+1) & h(d) & \cdots & h(d-T+2) \\ \vdots & & \ddots & \\ h(d+V) & h(d+V-1) & \cdots & h(d+V-T+1) \end{bmatrix} \begin{bmatrix} w(o) \\ w(1) \\ \vdots \\ w(T-1) \end{bmatrix}$$

The above matrix formula for the effective impulse response $h_{eff}(n)$, (d≦n≦d+V), may be expressed in short form as:

$$H_{effin}=H_{in} \cdot W_n$$

Thus, $H_{in}$ is determined at step 110 as a function of shifted sequences of h(n) evaluated at (d−T+1)≦n≦(d+V).

Next, at step 112, an (M+T−V−2)×T matrix $H_{out}$ is constructed as a function of h(n).

In particular, $H_{out}$ is determined by expanding the equation $h_{eff}(n)=h(n)*w(n)$ for 0≦n≦d−1 and (d+V+1)≦n≦(M+T−2). Using a similar derivation to expand the above equation for $h_{eff}(n)$ as was used for $H_{in}$ above, it can be shown that:

$$\begin{bmatrix} h_{eff}(0) \\ h_{eff}(1) \\ \vdots \\ h_{eff}(d-1) \\ h_{eff}(d+V+1) \\ h_{eff}(d+V+2) \\ \vdots \\ h_{eff}(M+T-2) \end{bmatrix} = \begin{bmatrix} h(0) & h(1) & \cdots & h(0-T+1) \\ h(1) & h(0) & \cdots & h(1-T+1) \\ \vdots & & \ddots & \\ h(d-1) & h(d-2) & \cdots & h(d-T+1) \\ h(d+V+2) & h(d+V+1) & \cdots & h(d+V-T+2) \\ h(d+V+2) & h(d+V+1) & \cdots & h(d+V-T+3) \\ \vdots & \vdots & \ddots & \vdots \\ h(M+T-2) & h(M+T-3) & \cdots & h(M-1) \end{bmatrix} \begin{bmatrix} w(0) \\ w(1) \\ \vdots \\ \\ \\ \\ \\ w(T-1) \end{bmatrix}$$

and, $$H_{effout}=H_{out} \cdot W_n$$

As will be apparent to those skilled in the art from the above teaching, the rows of the matrix $H_{out}$ consist of shifted segments of the impulse response h(n) where (−T+1)≦n≦(M+T−2).

At step 114 scalar values for $\beta_{out}$ and $\beta_{in}$ are established.

The cost function presented hereinabove and recited at step 116 may be viewed as solving for the T coefficients of the time-domain equalizer 33 which: (a) concentrates the energy of the effective impulse response $h_{eff}(n)$ of at least the communications channel combined with the time-domain equalizer substantially in a band of V+1 samples; and (b) controls the variance in the frequency spectrum of the output additive noise signal of the time-domain equalizer.

The cost function may be solved using any of the known techniques, it being preferred that the sequence w of T values representing the coefficients of the time-domain equalizer 33 are obtained using $w=(\sqrt{G^T})^{-1}e_{min}$, where $e_{min}$ is an eigenvector corresponding to the smallest eigenvalue of $(\sqrt{G})^{-1}(H_{out}^T H_{out}+\beta_{out}R)(\sqrt{G^T})^{-1}$.

The instant invention advantageously improves the bit rate and the variation in the bit rate of the discrete multi-tone communications system 2 while also ensuring stable convergence in calculating the T coefficients of the time-domain equalizer 33.

Referring now to Tables 1 and 2, the results of using the present invention in a discrete multi-tone communication system is presented for the average downstream and upstream bit rates, respectively, taken over a number of trials. The communication system employed a loop substantially comporting with the ANSI T1.601 loop 2 and employed parameters which substantially comported with the ANSI T1.413 standards. The time-domain equalization technique of the present invention is shown as compared to: (i) an estimate of the maximum achievable bit rate (or benchmark); (ii) PROCESS #1, (iii) PROCESS #2; and (iv) PROCESS #3.

TABLE 1

Downstream Bit Rate

| TEQ TECHNIQUE | 10 HDSL Bit Rate ($10^5$ b/s) | 24 ISDN Bit Rate ($10^5$ b/s) | 10 ADSL Bit Rate ($10^5$ b/s) | NO NEXT Bit Rate ($10^5$ b/s) |
|---|---|---|---|---|
| BENCHMARK | 0.16 | 2.52 | 7.60 | 12.56 |
| PROCESS 1 | 0.00 | 2.20 | 6.80 | 11.60 |
| PROCESS 2 | 0.00 | 1.16 | 1.36 | 10.96 |
| PROCESS 3 | 0.00 | 2.08 | 6.40 | 11.00 |
| Present Invention | 0.00 | 2.12 | 6.96 | 11.68 |

TABLE 2

Upstream Bit Rate

| TEQ TECHNIQUE | 10 HDSL Bit Rate ($10^5$ b/s) | 24 ISDN Bit Rate ($10^5$ b/s) | 10 ADSL-US Bit Rate ($10^5$ b/s) | NO NEXT Bit Rate ($10^5$ b/s) |
|---|---|---|---|---|
| BENCHMARK | 0.36 | 0.48 | 0.48 | 10.52 |
| PROCESS 1 | 0.28 | 0.48 | 0.28 | 8.36 |
| PROCESS 2 | 0.00 | 0.00 | 0.28 | 8.32 |
| PROCESS 3 | 0.00 | 0.44 | 0.16 | 8.32 |
| Present Invention | 0.28 | 0.40 | 0.28 | 8.32 |

For each of the time-domain equalization techniques shown in Tables 1 and 2, the measured bit rates are shown for four different near end cross-talk (NEXT) environments, namely, the 10 HDSL environment, the 24 ISDN environment, the 10 ADSL environment, and the NO NEXT environment. The time-domain equalization technique of the present invention out performed the other techniques under some conditions. It is also important to note that the time-domain algorithm of the present invention produced a lower variation in bit rate from trial to trial and also exhibited superior stability.

With reference to Table 3, the time-domain equalization technique of the present invention yielded results in the 10 ADSL NEXT interferers environment which out performed the other techniques in three wire loop environments, namely, the ANSI T1.601, loop 2 environment, the ANSI T1.601, loop 3 environment, and the ANSI T1.601, loop 7 environment. The communication system employed parameters which substantially comported with the ANSI T1.413 standard. The time-domain algorithm of the present invention produced a lower variation, in bit rate from trial to trial and also exhibited superior stability.

TABLE 3

Bit Rate

| TEQ TECHNIQUE | ANSI T1.601 Loop 2 Bit Rate ($10^5$ b/s) | ANSI T1.601 Loop 3 Bit Rate ($10^5$ b/s) | ANSI T1.601 Loop 7 Bit Rate ($10^5$ b/s) |
|---|---|---|---|
| BENCHMARK | 7.60 | 7.00 | 18.88 |
| PROCESS #1 | 6.80 | 5.88 | 18.24 |
| PROCESS #2 | 1.36 | 6.00 | 18.08 |
| PROCESS #3 | 6.40 | 6.12 | 18.52 |
| Present Invention | 6.96 | 6.20 | 18.52 |

Although the present invention has been described in relation to a particular embodiment thereof, many other variations and modifications and other uses will become apparent to those skilled in the art. It preferred, therefore, that the present invention be limited not by the specific disclosure herein, but only by the appended claims.

What is claimed is:

1. An apparatus for receiving a discrete multi-tone signal over a communications channel having an impulse response $h(n)$, energy of the impulse response being substantially concentrated in a first band of samples, the apparatus comprising:

a receiver for receiving the discrete multi-tone signal; and a T coefficient finite impulse response time-domain equalizer included in the receiver, the time-domain equalizer having an output additive noise signal, the T coefficients of the time-domain equalizer being provided such that:

(a) energy of an effective impulse response $h_{eff}(n)$ of at least the communications channel combined with the time-domain equalizer is substantially concentrated in a second band of V+1 samples, whereby the second band of samples is shorter than the first band of samples; and (b) a variance in a frequency spectrum of the output additive noise signal of the time-domain equalizer is controlled.

2. The apparatus of claim 1, wherein the time-domain equalizer has an input additive noise signal, the T coefficients of the time-domain equalizer being provided as a function of both the input additive noise signal and an estimate of the impulse response $h(n)$.

3. The apparatus of claim 2, wherein the receiver is operable to compute the T coefficients of the time-domain equalizer as a function of balancing (i) a degree to which the energy of the effective impulse response $h_{eff}(n)$ is concentrated in the second band of V+1 samples; and (ii) a degree to which the variance in the frequency spectrum of the output additive noise of the time-domain equalizer is reduced.

4. The apparatus of claim 3, wherein the receiver is operable to vary the degree to which the energy of the effective impulse response $h_{eff}(n)$ is concentrated in the second band of V+1 samples; and the degree to which the variance in the frequency spectrum of the output additive noise of the time-domain equalizer is reduced.

5. The apparatus of claim 3, wherein the receiver is operable to compute the T coefficients of the time-domain equalizer by evaluating the following system of equations:

$$\min\nolimits_{w} w^T(H_{out}^T H_{out} + \beta_{out} R)w, \text{ subject to } w^T(H_{in}^T H_{in} + \beta_{in} R)w = 1,$$

where w is a T×1 matrix representing the T coefficients of the time-domain equalizer, $H_{out}$ is an (M+T−V−2)×T matrix representing samples of the estimated impulse response $h(n)$ of the communications channel which produce M+T−V−2 samples of the effective impulse response $h_{eff}(n)$ not containing concentrated energy when matrix w is multiplied by $H_{out}$, $H_{in}$ is a (V+1)×T matrix representing samples of the estimated impulse response $h(n)$ of the communications channel which produce the V+1 samples of the effective impulse response $h_{eff}(n)$ having concentrated energy when matrix w is multiplied by $H_{in}$, R is a T×T additive noise correlation matrix constructed from the input additive noise signal, and $\beta_{out}$ and $\beta_{in}$ are scalars which vary the degree to which the energy of the effective impulse response $h_{eff}(n)$ is concentrated in the second band of V+1 samples; and the degree to which the variance in the frequency spectrum of the output additive noise of the time-domain equalizer is reduced.

6. The apparatus of claim 5, wherein the receiver is operable to obtain w by solving $w = (\sqrt{G^T})^{-1} e_{min}$, where $G = H_{in}^T H_{in} + \beta_{in} R$ and $e_{min}$ is an eigenvector corresponding to the smallest eigenvalue of $(\sqrt{G})^{-1}(H_{out}^T H_{out} + \beta_{out} R)(\sqrt{G^T})^{-1}$.

7. A method of determining T coefficients of a finite impulse response time-domain equalizer having input and output additive noise signals, the time-domain equalizer being employed in a receiver for receiving a discrete multitone signal over a communications channel having an impulse response h(n), energy of the impulse response being substantially concentrated in a first band of samples, the method comprising the step of:

computing the T coefficients of the time-domain equalizer such that:

(a) energy of an effective impulse response $h_{eff}(n)$ of at least the communications channel combined with the time-domain equalizer is substantially concentrated in a second band of V+1 samples, whereby the second band of samples is shorter than the first band of samples; and (b) a variance in a frequency spectrum of the output additive noise signal of the time-domain equalizer is controlled.

8. The method of claim 7, further comprising the step of balancing (i) a degree to which the energy of the effective impulse response $h_{eff}(n)$ is concentrated in the second band of V+1 samples; and (ii) a degree to which the variance in the frequency spectrum of the output additive noise of the time-domain equalizer is reduced.

9. The method of claim 8, further comprising the step of varying the degree to which the energy 6f the effective impulse response $h_{eff}(n)$ is concentrated in the second band of V+1 samples; and the degree to which the variance in the frequency spectrum of the output additive noise of the time-domain equalizer is reduced.

10. The method of claim 7, further comprising the steps of:

estimating the impulse response h(n) of the communication channel;

estimating the input additive noise signal to the time-domain equalizer;

providing a T×1 matrix w representing the T coefficients of the time-domain equalizer;

providing a (V+1)×T matrix $H_{in}$ representing samples of the estimated impulse response h(n) of the communications channel which produce the V+1 samples of the effective impulse response $h_{eff}(n)$ having concentrated energy when matrix w is multiplied by $H_{in}$; and providing an (M+T−V−2)×T matrix $H_{out}$ representing samples of the estimated impulse response h(n) of the communications channel which produce M+T−V−2 samples of the effective impulse response $h_{eff}(n)$ not containing concentrated energy when matrix w is multiplied by $H_{out}$.

11. The method of claim 10, further comprising the steps of:

providing a T×T additive noise correlation matrix R from the input additive noise signal, and determining scalars $\beta_{out}$ and $\beta_{in}$ which control a degree to which the energy of the effective impulse response $h_{eff}(n)$ is concentrated in the second band of V+1 samples; and a degree to which the variance in the frequency spectrum of the output additive noise of the time-domain equalizer is reduced.

12. The method of claim 11, wherein the step of computing the T coefficients of the time-domain equalizer is obtained by solving the following system of equations:

$$\min|_w w^T(H_{out}^T H_{out} + \beta_{out} R) w, \text{ subject to } w^T(H_{in}^T H_{in} + \beta_{in} R) w = 1.$$

13. The method of claim 11, wherein w is obtained by solving $w = (\sqrt{G^T})^{-1} e_{min}$, where $G = H_{in}^T H_{in} + \beta_{in} R$ and $e_{min}$ is an eigenvector corresponding to the smallest eigenvalue of: $(\sqrt{G})^{-1}(H_{out}^T H_{out} + \beta_{out} R)(\sqrt{G^T})^{-1}$.

* * * * *